Sept. 29, 1959 E. H. LYSLE 2,906,165
OPTICAL RECTIFIER APPARATUS
Filed Sept. 24, 1954 10 Sheets-Sheet 1

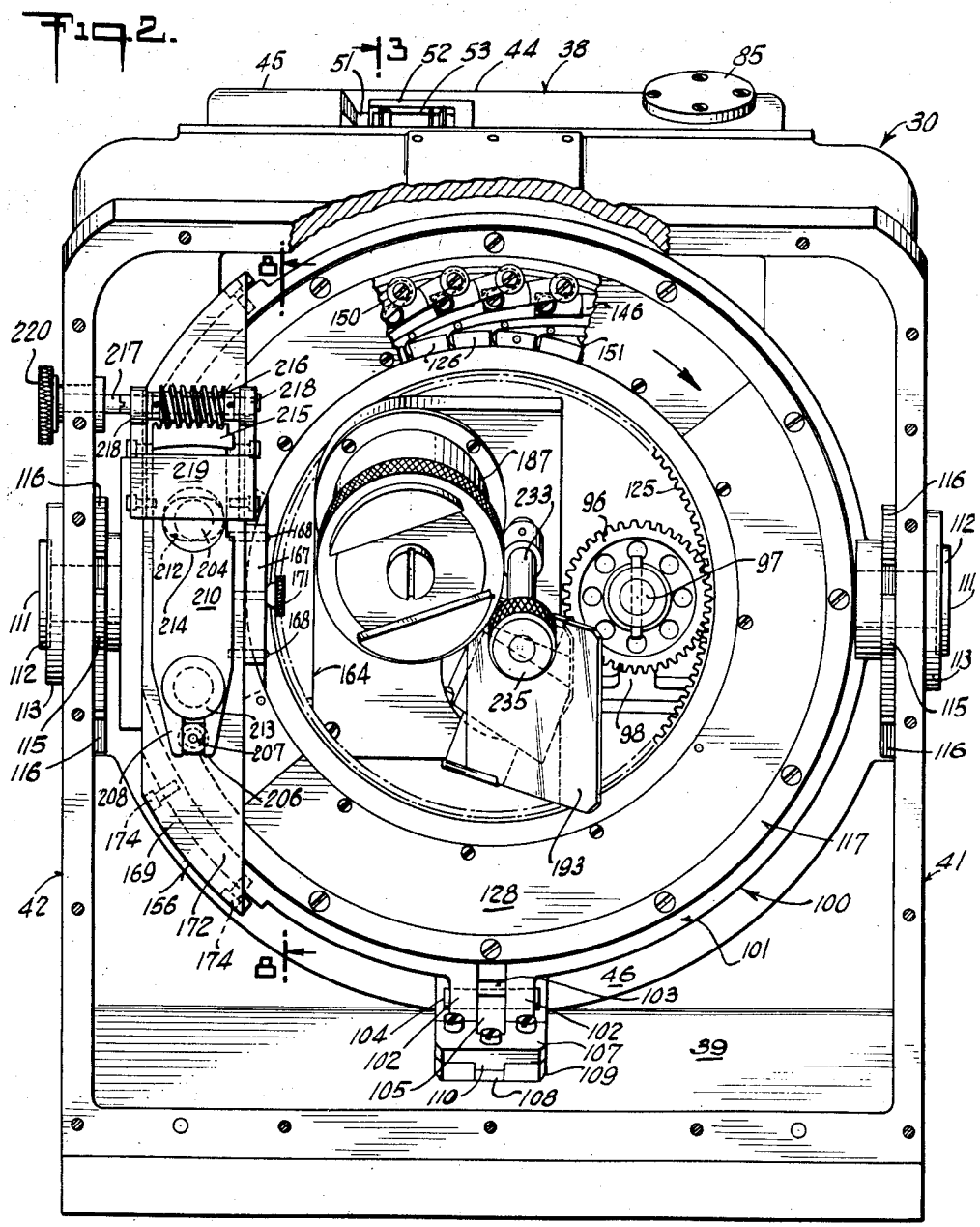

Sept. 29, 1959  E. H. LYSLE  2,906,165
OPTICAL RECTIFIER APPARATUS
Filed Sept. 24, 1954  10 Sheets-Sheet 3

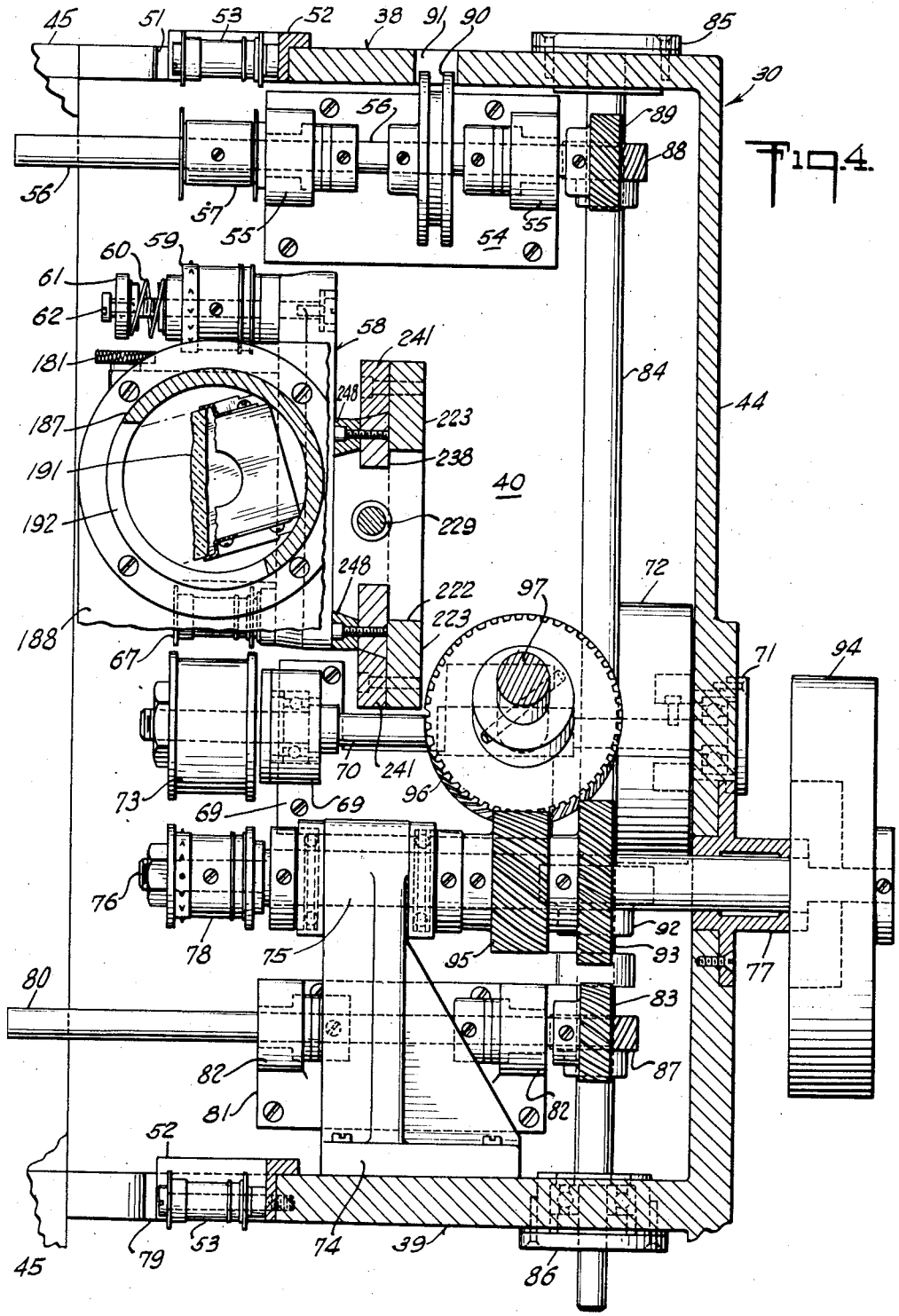

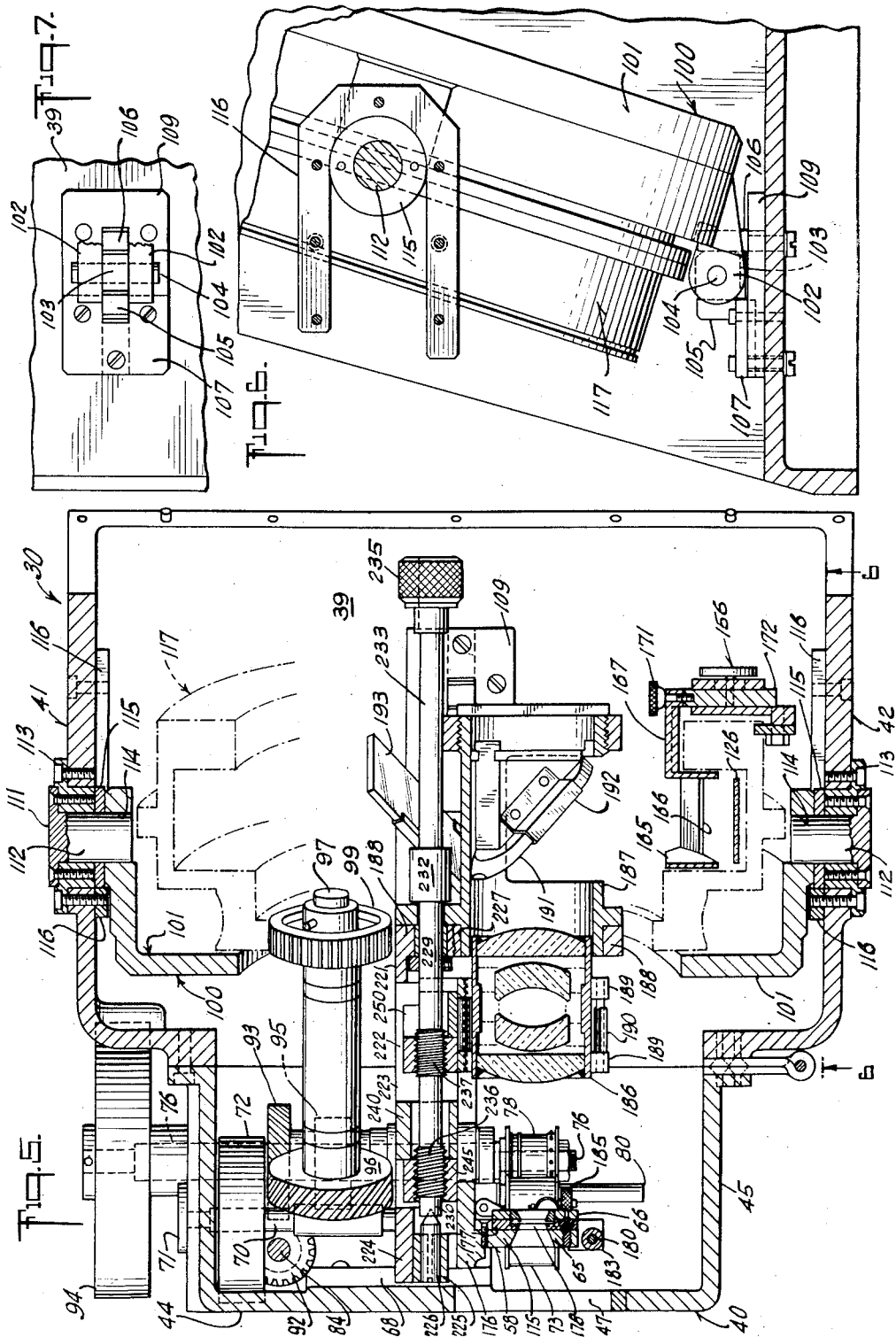

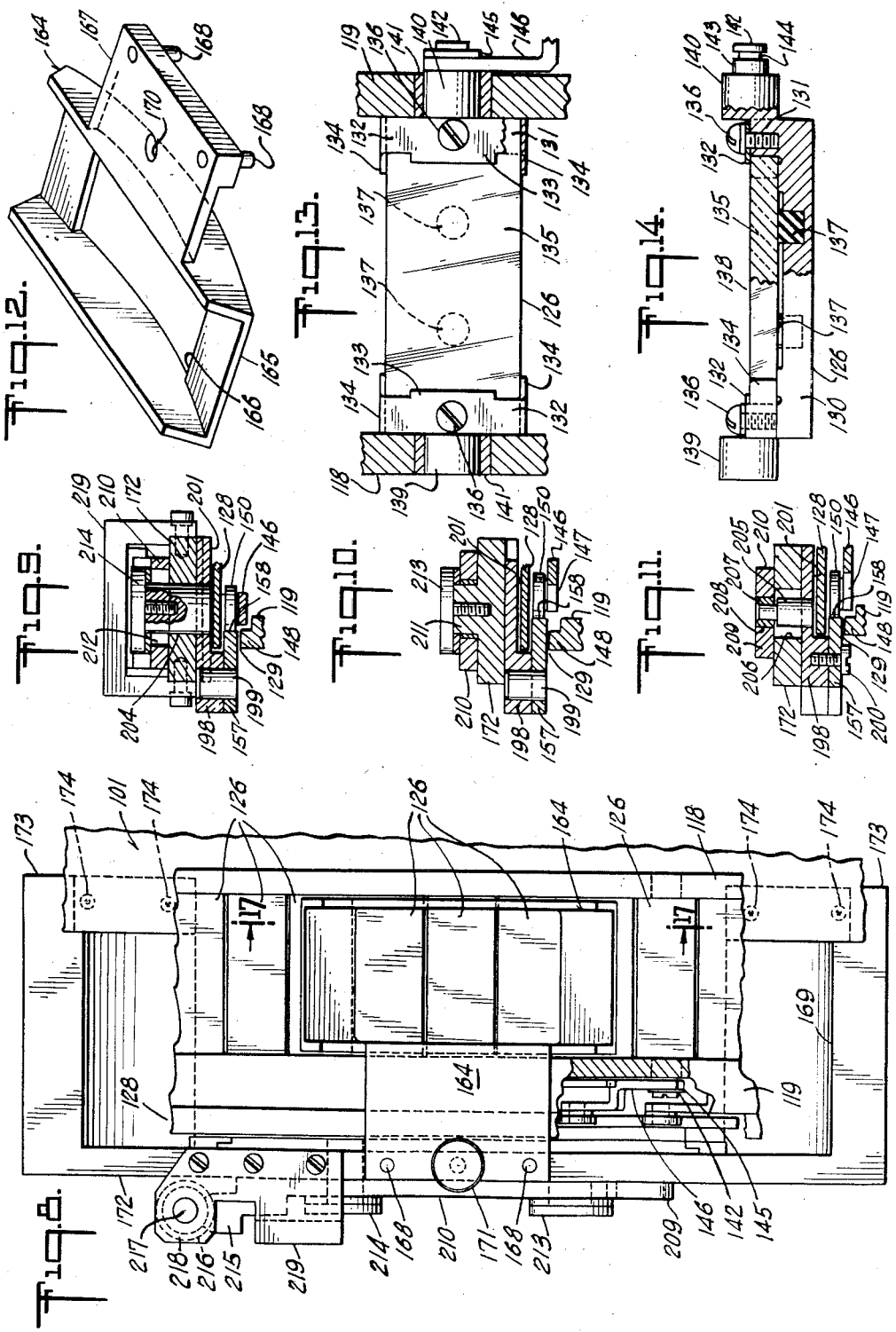

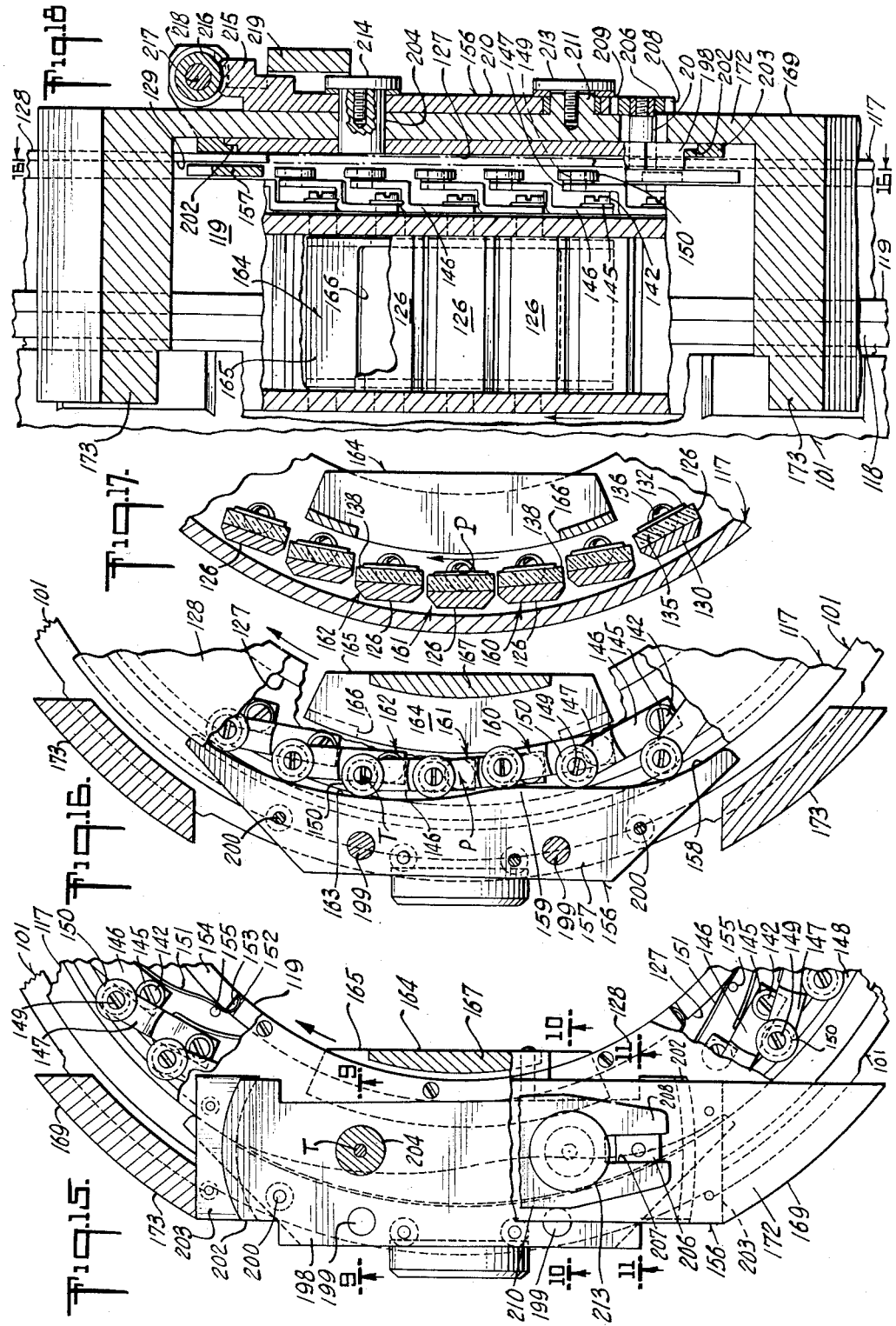

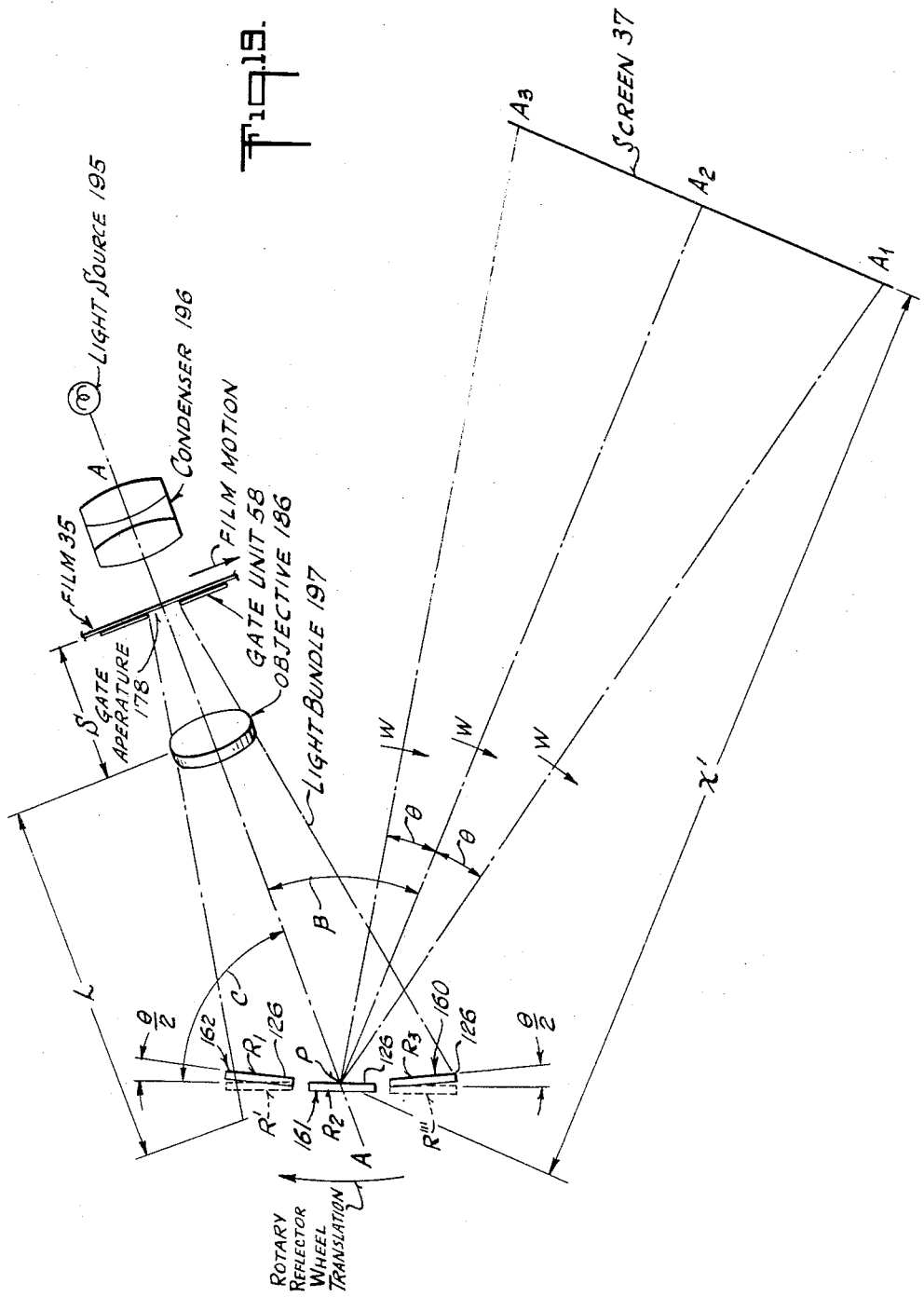

Sept. 29, 1959　　　　E. H. LYSLE　　　　2,906,165
OPTICAL RECTIFIER APPARATUS
Filed Sept. 24, 1954　　　　　　　　　　　　10 Sheets-Sheet 9
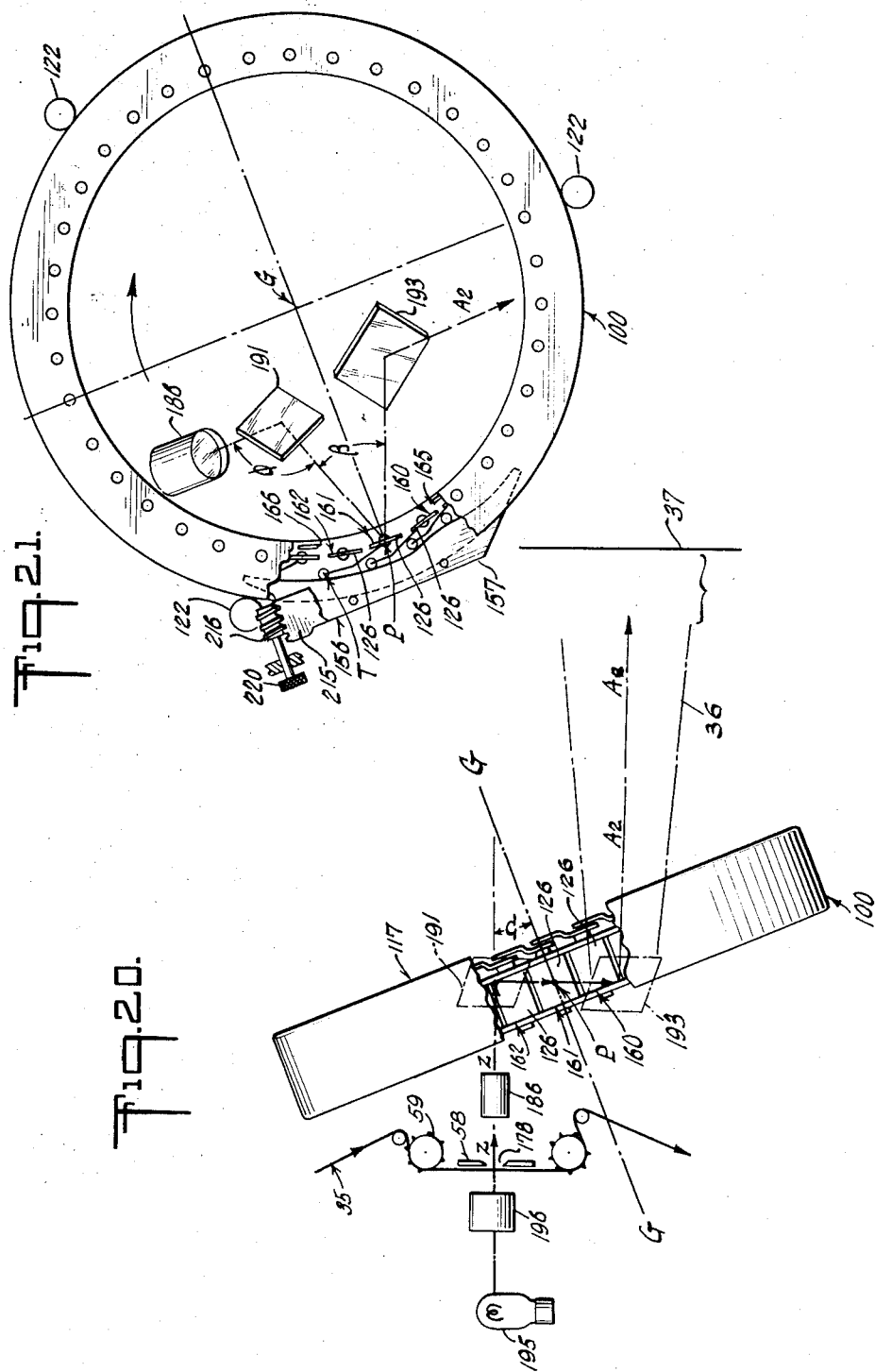

Sept. 29, 1959  E. H. LYSLE  2,906,165
OPTICAL RECTIFIER APPARATUS
Filed Sept. 24, 1954  10 Sheets-Sheet 10

United States Patent Office 2,906,165
Patented Sept. 29, 1959

2,906,165

OPTICAL RECTIFIER APPARATUS

Edmond Holden Lysle, deceased, late of New Canaan, Conn., by Audrey A. Lysle, administratrix, Kew Gardens, N.Y.

Application September 24, 1954, Serial No. 458,202

12 Claims. (Cl. 88—16.8)

The present invention relates to optical apparatus adapted to the making and projecting of moving pictures and, more particularly, to that type wherein the film, either sensitized for recording or carrying a series of positive prints or frames for projection, is moved continuously past the aperture with the fixed lens system continuously open, the motion of the film being compensated for by movement of optical elements in the optical path.

A general object of the present invention is to provide such optical apparatus which may be produced, assembled and operated efficiently while being of simplified construction and unusually small bulk; the structure being characterized by rotary reflector wheel mechanism through which the optical path extends and pivotally carrying inside reflectors, means being provided successively to swing a group of the latter as they are rotatably translated through a field of illumination of the optical path, which may simultaneously reflect a plurality of similar images for superimposition when the gate aperture is of a plural-frame size.

A more specific object of the present invention is to provide such optical apparatus characterized by a film track located to one axial side of the rotary reflector wheel mechanism with an intervening objective, the rotary reflector wheel mechanism comprising a driven open rotatable ring permitting passage therethrough of a light beam with the inside reflectors being juxtaposed and of the flat-plane type successively swung as they are rotatably translated through the field of illumination provided by a portion of the beam deflected thereto so that a plurality of the reflectors are simultaneously located in the illumination field as each is successively translated therethrough with the optical axes of adjacent reflectors of the group which are simultaneously in the field being maintained during reflector translation at substantially the angle one film frame pitch subtends with the node of the objective. Thus when the apparatus is employed as a projector a plurality of the images reflected to a screen from the group of swingable reflectors being simultaneously translated through the illumination field will be superimposed effectively if the gate aperture is of a plural-frame size, this characteristic operation permitting efficient projection of pictures in natural color when the images of the superimposed group are projected respectively in primary colors.

Another object of the present invention is to provide such apparatus in a form permitting effective practice of natural color photography with the images being formed in primary colors by the use of dichroic mirrors as the swingable reflectors.

An additional object of the invention is to provide such projector apparatus with fixed-position cam means against which is wiped successively followers each mounted on one of the swingable reflectors to give the successive swinging action to the reflectors as they are translated through the illumination field, the cam means being easily and quickly adjustable in orientation to adjust the angle between the successive reflectors for attainment of proper image offset at the screen under varying conditions of difference in picture pitch (which may result from film shrinkage) and of magnification of the optical system (dictated by the distance between the projector and screen).

A further object of the invention is to provide such apparatus with simple focus adjustment means in the form of compound screw means simultaneously to adjust along the optical path the distances from the relatively fixed-position rotary reflector wheel mechanism to the objective and to the aperture or gate unit, the latter being provided with relatively greater rate of travel by use of threads of greater pitch while the ratio of these distances is maintained constant.

Still another object of the invention is to provide a structural embodiment of the optical apparatus which is readily constructed and permits efficient use and operation thereof.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

Fig. 3 is a sectional view of the apparatus shown in Fig. 2 taken substantially on line 3—3 thereof to illustrate in side elevation many of the internal mechanism parts, the front cover being illustrated in case-closing position;

Fig. 4 is an enlarged elevational section taken substantially on line 4—4 of Fig. 3, with parts broken away;

Fig. 5 is a transverse section taken substantially on line 5—5 of Fig. 3;

Fig. 6 is a sectional detail, with parts broken away, taken substantially on line 6—6 of Fig. 5;

Fig. 7 is a detail plan view, with parts broken away, of certain nest shackle structure shown in Fig. 6;

Fig. 8 is an inside elevational view, with parts broken away, of the rotary reflector wheel mechanism structure shown in Figs. 2 to 7 incl. to the left of line 8—8 of Fig. 2;

Fig. 9 is a detail section taken substantially on line 9—9 of Figs. 8 and 15;

Fig. 10 is a detail section taken substantially on line 10—10 of Figs. 8 and 15;

Fig. 11 is a detail section taken substantially on line 11—11 of Figs. 8 and 15;

Fig. 12 is a perspective view of a masking unit illustrated in Figs. 8 and 15 to 18 incl. for the purpose of confining simultaneous impingement of the light beam to a limited number of the swingable reflectors;

Fig. 13 is an enlarged plan view, with parts broken away, of one of the swingable reflectors and its mount by the rotatable ring means, showing parts thereof in section;

Fig. 14 is a side elevational view of substantially the structure shown in Fig. 13, with parts broken away and in section;

Fig. 15 is a front elevational view, with parts broken away and in section, of the structure shown in Fig. 8;

Fig. 16 is a sectional view of the structure shown in Fig. 15 taken substantially on line 16—16 of Fig. 18, some parts being broken away;

Fig. 17 is a sectional view, with parts broken away, taken substantially on line 17—17 of Fig. 8;

Fig. 18 is an outside elevational view, with parts broken away and in section, of the structure shown in Figs. 8, 15, 16 and 17;

Fig. 19 is a schematic view of essential parts of the optical path of an embodiment of the present invention diagrammatically illustrating elements thereof and their geometrical relationship;

Fig. 20 is a diagrammatic illustration of the embodiment of the principles illustrated in Fig. 19 in the form of the invention illustrated by way of example in Figs. 2 to 18 incl., the parts being viewed in side elevation with some broken away;

Fig. 21 is a diagrammatic view similar to Fig. 20 showing the parts in elevation as viewed in a plane parallel to the face of the rotatable ring means, being an axial projection of the latter;

Figure 1:
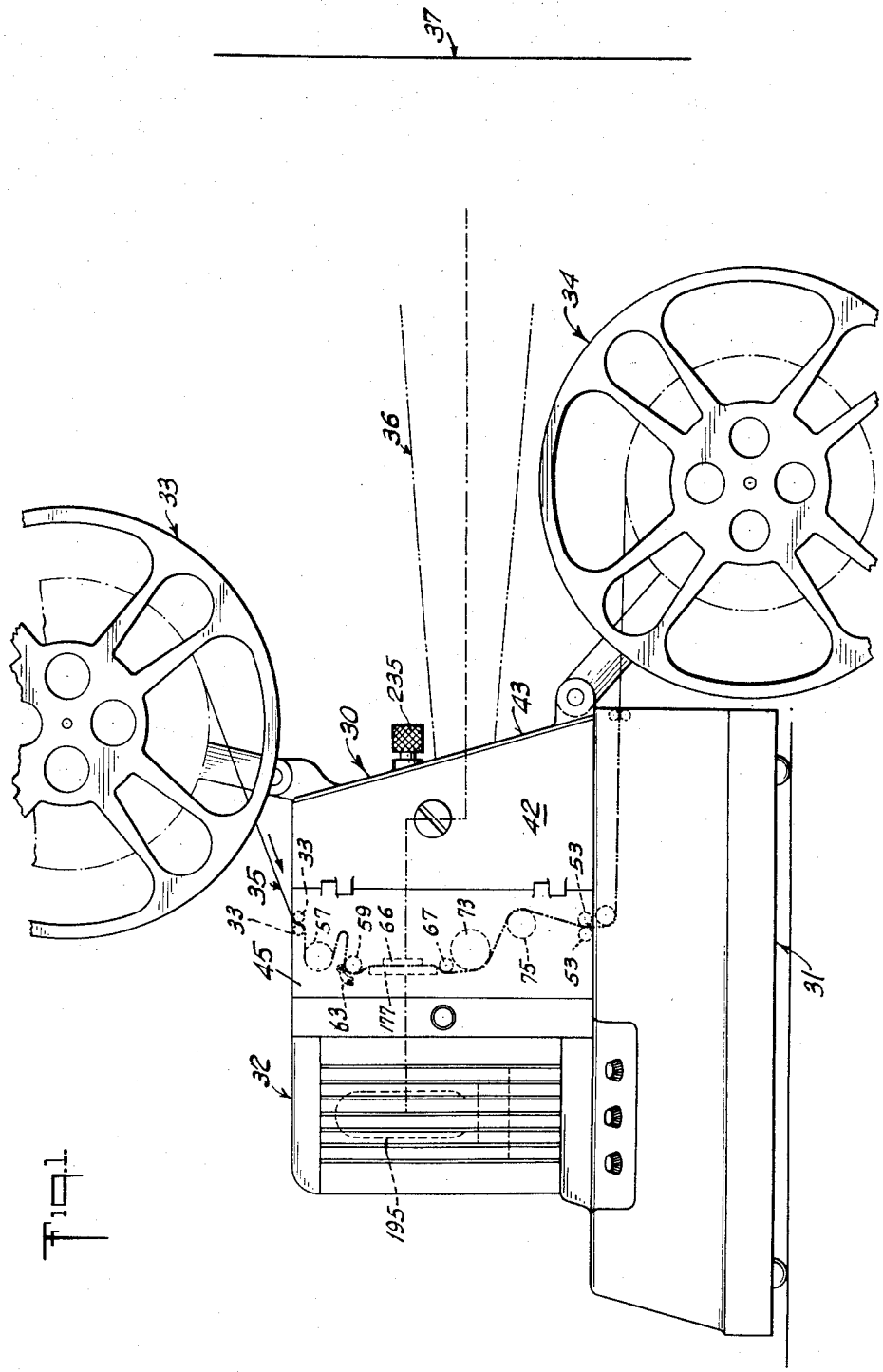
Fig. 1 is a side elevational view, with parts broken away, illustrating use of an embodiment of the optical apparatus of the present invention as a moving picture projector when supplemented by additional equipment, including supply and take-up reels, a supporting base and a light source unit.

Referring to the drawings, in which similar parts bear like numerals, there is therein illustrated by way of example an embodiment of the invention which has been constructed and successfully operated, and for the purpose of an understanding of the present optical apparatus, its use as a projector of moving pictures from a continuously moving film carrying uscessively-arranged positive prints or photographic records in the form of juxtaposed frames has been illustrated. However, those skilled in the art will readily understand the manner in which the device may be modified with supplemental equipment for the purpose of recording successive image frames on a sensitized film to serve as a camera, suitable masking means being employed to exclude light and properly to direct the incident beam along the optical path to the sensitized film.

As proposed in Fig. 1, the illustrated embodiment of the optical apparatus 30 may be suitably supported upon a base unit 31 which also carries behind the apparatus of the present invention a suitable light source unit 32. Suitable supply and take-up reels 33 and 34 are mounted thereon continuously to move through the apparatus 30 a moving picture film 35 carrying the usual successively-arranged positive prints or picture frames for projection therefrom of an image beam 36 toward a suitable screen 37 of conventional type.

Figure 2:
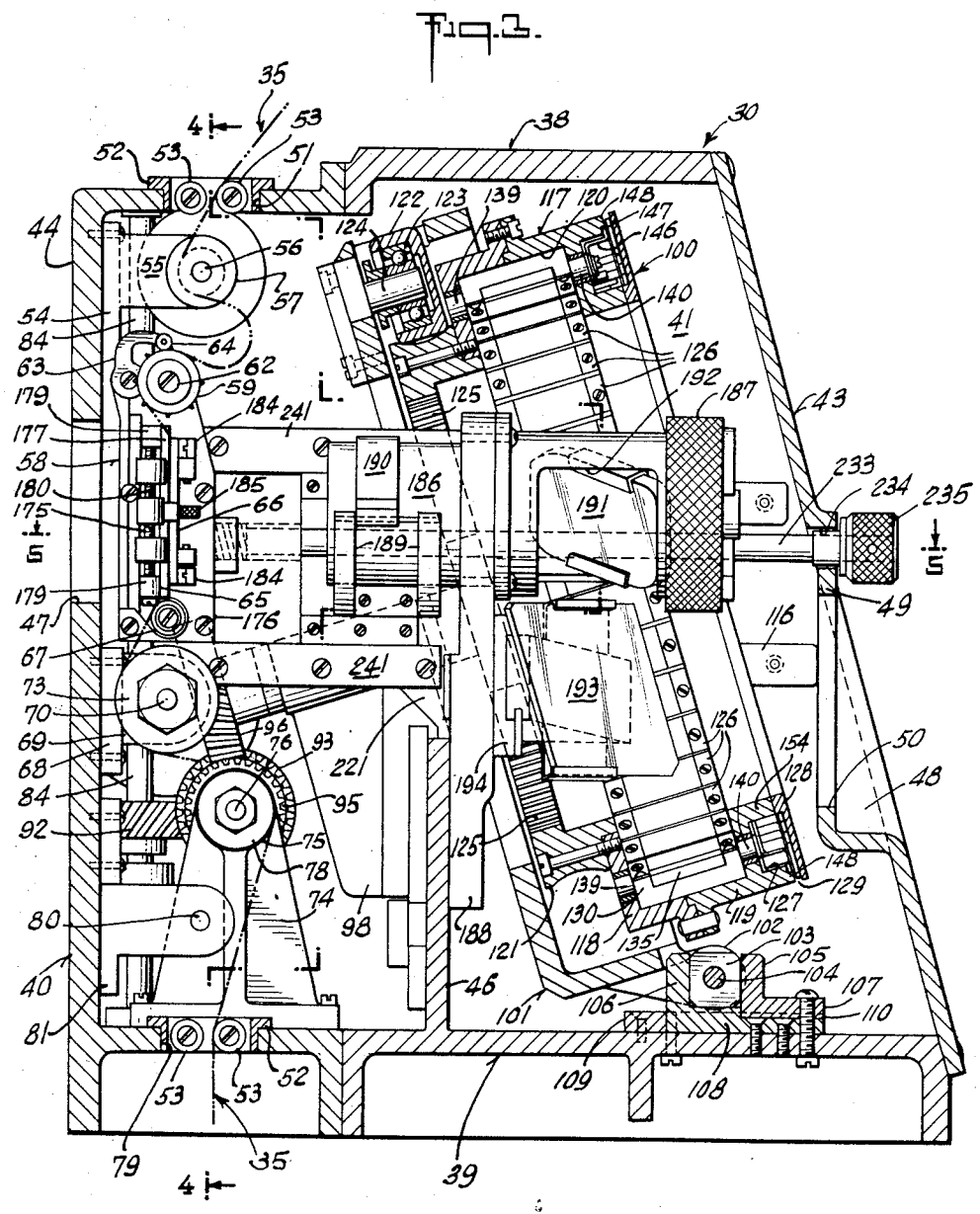
Fig. 2 is a front perspective view, with parts broken away and the front cover removed, of an embodiment of the present invention which may be employed either as a projector when associated with suitable additional equipment, as proposed in Fig. 1, or as a camera for recording a series of positive prints on film when properly equipped with supplemental means in a conventional manner.

As will best be seen from Figs. 2 to 5 incl., the embodiment of the optical apparatus of the present invention 30 may comprise an encased frame structure having a substantially horizontal base and including a top wall 38, bottom wall 39, back wall 40, right and left side walls 41 and 42, as viewed from the front in Fig. 2, and front wall 43, preferably in the form of a removable panel or cover as will be best understood from Fig. 3. Preferably, the back wall 40 has the major portion thereof provided in the form of a recessed panel 44 having one side constructed in the form of a pivotally-mounted access door 45, as is best seen in Figs. 1 and 5. The base wall 39 preferably is provided with an upstanding transversely-arranged partition or cross wall 46 for fixed support of optical units, as will be noted from Figs. 2 and 3 and more fully understood from the following description. The back wall 40 preferably has a circular hole 47 therein to serve as an inlet for the light beam projecting from a light source unit, such as that illustrated at 32 in Fig. 1, and which may include the usual condenser lens. As will be understood from Fig. 3, the front panel 43 is preferably arranged in a transverse oblique plane so as to be substantially parallel to certain rotary reflector wheel mechanism hereinafter described and is provided with a localized recess 48 having a substantially vertical back wall 49 in which is formed a beam outlet opening 50. Of course, when the embodiment of the optical apparatus illustrated in the drawings is employed as a camera, the opening 50 serves as a beam inlet opening and the light source opening 47 is closed off.

As will be seen from Figs. 2, 3 and 4, the top wall 38 of the casing, preferably the top of the recessed back wall 40, is provided with a film passage slot 51 in which is fitted a U-shaped roller frame 52 carrying a pair of laterally-spaced freely-rotatable rollers 53, 53, between which the film 35 is threaded, and preferably the side of the slot 51 extends to the edge of the door 45 so that the film may be readily placed between these rollers when the access door is open. The back wall 40 defined by a portion of the recessed plate 44 supports a bearing bracket 54 carrying a pair of laterally-spaced journals 55, 55 through which is rotatably supported a cross shaft 56, in turn carrying fixed thereto a pulley or spool 57 to be driven thereby. Film track or gate unit 58 is slidably supported on the cross wall or partition 46 in a manner more fully explained hereinafter and carries a rotatably-mounted sprocket roll 59 which is suitably braked by helical spring 60 held under compression between the end of the sprocket roll and a tension-applying nut 61 threadably mounted on the externally-threaded outer end of roll stub shaft 62. A biased pivoted bracket arm 63, shown in Fig. 3, carries a presser roller 64 to snug the film 35 against the sprocket roll 59 with the latter imposing drag upon the film as it is pulled through the film track or gate unit 58. The gate unit 58 includes the usual apertured film track or backing plate 65 and a pivoted pressure or gate plate 66 between which the film 35 is to be pulled. Gate unit 58 also carries a freely-rotating roll 67 below the aperture and gate plates 65 and 66. The back wall 40 defined by a portion of recessed plate 44 also carries another journal bracket 68 carrying a journal 69 through which a cross shaft 70 is rotatably supported for free rotation with the far end of this shaft supported by thrust bearing unit 71 fixed in a portion of the side wall 41 provided by recessed plate 44, as will be seen from Figs. 4 and 5. The shaft 70 carries a flywheel 72 and a pulley or spool 73 fixed thereto. The base 39, preferably that portion thereof provided by the recessed plate 44, supports a bearing bracket 74 carrying a journal 75 through which is rotatably supported a driven cross shaft 76 with the far end of the latter rotatably supported through side wall 41, preferably that portion thereof provided by recessed plate 44, by a bearing 77. The cross shaft 76 carries fixed thereto, for drive thereby, another sprocket roll 78 for the purpose of pulling the film through the gate unit 58 against the drag applied by the braked sprocket roll 59. The base wall 39 has a slot 79 provided therein in which is also mounted another U-shaped roller frame 52 rotatably carrying a pair of laterally-spaced rollers 53, 53.

As will be best understood from Figs. 1 and 3, the strip of film 35 is fed from supply reel 33 down through between the pair of top rollers 53, 53, lapped about driven spool 57 and trained between the braked sprocket roll 59 and the presser roller 64. The film is then fed down between apertured track plate 65 and gate plate 66, lapped behind freely-rotatable roller 67, lapped about the flywheel-loaded freely-rotatable spool 73 and then over driven sprocket roll 78, and finally is pulled down through between the bottom pair of laterally-spaced rollers 53, 53 and out of the encased apparatus unit 30 for winding up on drive take-up reel 34.

The mechanism to drive this film-advancing means in a continuous manner at a uniform rate of speed and the other mechanism of the embodiment of the optical apparatus illustrated in the drawings may consist of an electrical motor (not shown) housed behind the door 45 and suitably coupled to a cross shaft 80 constituting the main drive shaft of the apparatus. The back wall 40 defined by a portion of the recessed plate 44 also supports a third bearing bracket 81 carrying a pair of laterally-spaced journals 82, 82 through which is rotatably supported the cross shaft 80 with the far end of the latter carrying fixed thereto a spiral gear 83, as will be seen in Fig. 4.

A vertical shaft 84 is rotatably supported by bearing units 85 and 86 respectively fixed in those portions of the top wall 38 and the base wall 39 provided by the recessed plate 44, as is best seen in Fig. 4. The vertical shaft 84 carries fixed thereto a spiral gear 87 meshed with spiral gear 83 fixed on driven cross shaft 80 so as to drive the vertical shaft. Vertical shaft 84 also carries fixed thereto another spiral gear 88 meshed with spiral gear 89 fixed on the top cross shaft 56 for drive of the latter. Top cross shaft 56 also preferably carries fixed thereto a pulley 90 located in slot 91 in that portion of the top wall 38 provided by recessed plate 44 which may be employed for belt drive of the supply reel 33 when driven for rewind. A third spiral gear 92 fixed on vertical shaft 84 is meshed with spiral gear 93 fixed on cross shaft 76 to drive the latter and this cross shaft carries on the far end thereof, beyond the right side wall 41, a flywheel 94 so as to assure uniform speed. Driven cross shaft 76 also carries a spiral gear 95 fixed thereto, in turn meshed with a spiral gear 96. The spiral gear 96 is fixed upon an oblique shaft 97, as seen in Figs. 3, 4 and 5, with that shaft rotatably supported by a journal bracket 98 mounted upon cross wall or partition 46. Oblique shaft 97 carries fixed thereto, above and forward of journal bracket 98, a spur gear 99 for drive of the rotary reflector wheel mechanism at a uniform rate of speed synchronized with the rate of travel of the film through the gate unit.

As will be seen from Figs. 2, 3 and 5, rotary reflector wheel mechanism 100 preferably comprises a cupped basket or nesting ring 101 carrying on its lower side a bifurcated shackle knuckle in the form of a pair of laterally-spaced apertured ears 102, 102 between which is received a pierced block 103, through which and the ears a pin 104 is driven. The block 103 is cradled between a pair of upwardly-extending projections 105 and 106 respectively fixed on plate 107 and bar 108. Bar 108 is relatively narrow and nested in the slot in a U-shaped base member 109 together with a land 110 on the bottom of plate 107. The U-shaped base member 109 is fixed, such as by screws, to the base 39 of the encased unit 30, as is the narrow bar 108, and suitable bolts securely fasten the three members 107, 108 and 109 together and to the casing base 39. The nesting ring 101 is likewise supported in the case at opposite sides by trunnions 111, 111 so that the nesting ring may be swung on a horizontal axis with adjustment at the bottom shackle to adjust the cant or oblique position thereof as dictated by requirements of the optical system. As best seen in Figs. 5 and 6, each of said mounting trunnions 111 consists of a headed pin 112 extending through a sleeve or hub bushing 113 fixed in a hole in either of the side walls 41 and 42 and extending through into a hole 114 in the nesting ring 101, so that the latter is pivotally supported on a horizontal axis. Support of each of the pins 112 is supplemented by support of a washer or ring 115 thereon in a U-shaped guide bracket 116 fixed to the inner face of the side wall.

The rotary reflector wheel mechanism 100 includes a rotatable ring means 117 which, as is best seen in Fig. 3, preferably is formed of two opposed cup-shaped members 118 and 119 suitably secured together to provide therebetween an annular groove 120. The cup-shaped member 118 carries an annularly-grooved, cylindrical track flange 121 fixed to the back side thereof and rotatably supported in the basket or nest ring 101 by a plurality of fixed rolls 122, each suitably supported by a bearing 123 on stub shaft 124 fixed inside the basket or nest ring 101. The track flange 121 is provided with an annular rack or ring gear 125 meshed with the driving spur gear or pinion 99 so that the rotatable ring means 117 is driven from the driving mechanism previously described, as will be seen from Figs. 2, 3 and 5. The rotatable ring means 117 carries therein for rotary translation a plurality of successively-arranged, juxtaposed, pivoted, flat-plane reflectors 126—126, the structure of which will be described later. In the outer face of the outer cup member 119 of the gyro ring 117 is provided an annular groove 127 in which is located cam follower means for rocking or swinging the reflectors 126—126 and with that groove covered by an annular cover plate 128, preferably sectioned. The peripheral edge of the annular cover plate 128 is spaced from the ring cup member 119 to provide a circumferential space 129 through which is to be wiped cam means for operating the cam followers of the swingable reflectors, which will be understood from Figs. 3, 9 to 11 incl. and 18.

The structure of the swingable reflectors 126—126 and their operating cam followers will be best understood from Figs. 3, 8, and 13 to 18 incl. As there shown, each reflector 126 preferably comprises a rocker bed or cradle plate 130 which has at each end a land 131 on which is seated a cap plate 132. Each cap plate 132 is provided with a lateral top flange 133 and a pair of side flanges 134, 134 so as to box in, in cooperation with the bed plate 130, one end of a rectangular mirror element 135. The cap plates 132, 132 are mounted to the bed plate 130 by suitable cap screws 136, 136 threadably received in internally-threaded sockets in the lands 131, 131. Preferably, each mirror 135 is biased outwardly against the cap plates 132, 132 by suitable biasing means, such as resilient members, e.g., elastic blocks 137, 137, so as to assure that the outer reflecting face 138 of the mirror is maintained precisely in the plane of the top faces of the lands 131, 131. The ends of the plate 130, 130 are equipped with trunnions 139 and 140, the axes of which are disposed in the plane of the outer face 138 of the mirror 135 which is suitably treated with reflecting material to constitute the reflective face thereof. Trunnions 139 and 140 are pivotally mounted through suitable bearing sleeves 141, 141 respectively inserted in aligned holes in the ring cup members 118 and 119.

The trunnion 140 carries on the outer end thereof a stub shaft 142 preferably made integral therewith and provided with a square shank 143 and an annular groove 144. The annular groove 144 is adapted to receive a split ring or washer 145 after the square shank is received in a square hole in a cam follower lever arm 146 so as to fix the latter to the bed plate 130 for rock or swing of this plate with swing of the cam follower lever arm. Each cam follower lever arm 146 is offset in an axial direction, as is best seen in Figs. 3 and 18, with the far end 147 thereof disposed adjacent an annular flange 148 (Figs. 3 and 15) serving as a swing-limiting stop. The far end 147 of each offset lever arm 146 carries a stud 149 on which is preferably press-fitted a cam follower roller 150 disposed in the annular slot 129 between the annular flange 148 and the annular cover plate 128, with these follower rollers defining a circular path of travel in that slot upon rotation of the ring means 117. Each cam follower lever arm 146 is biased radially outwardly against the stop provided by the annular flange 148, preferably by means of a leaf spring 151 having a hooked end 152 wedged into a radial slot 153 in annular flange 154 of rotatable ring means cup member 119, which defines the inside wall of the annular groove or chamber 127, with a pin 155 in the latter assuring secure anchorage of the leaf spring.

Along the circular path defined by the rotating cam follower rollers 150—150, during rotation of the rotatable ring means 117 in a clockwise direction as viewed from the front, the far ends 147—147 of the cam follower lever arms 146—146 and the follower rollers carried thereby lead into suitable, relatively fixed cam means 156, as will be seen from Figs. 2, 15, 16 and 18. This simplifies the contouring of the cam means and its location in the apparatus, permitting it to be located in the vicinity of the trunnion axis of the rotary reflector wheel mechanism 100, where manual adjusting means may be brought directly out of the side wall 42 of the case. The cam means comprises a cam plate 157 having an inside edge 158 of a contour substantially that indicated in Fig. 16 and located in the annular slot 129 so as to be wiped by the cam follower rollers 150—150 as they are rotated by the rotatable ring means 117. The inside edge 158 of the cam 157 is thus provided with a lobe 159 so as to swing each cam arm 146 radially inward as its reflector 126 is moved to an initial position 160 on approach toward a mid-position 161, as seen in Fig. 17. The mid-position 161 is dictated by a coincidence at point P of the optical axis of the reflector mirror 135 thereat with the principal axis of the incident beam. The plane of the reflective surface 138 of the following swingable reflector mirror 135 at the approach position 160 is thus caused by this cam swing of its arm 146 to extend through this point P. On recession of the reflector 126 from the mid-position at 161 to a third position of recession 162, its cam follower 150 rides along a receding portion 163 of the cam edge 158 to cause the reflector 126 further to swing so that the plane of its reflective surface 138 continues to extend through the point P. The reasons for so rocking or swinging the reflectors as they are translated through the beam or bundle of light rays defining a field of illumination, including the reflector positions 160, 161 and 162 of Fig. 17, will be more fully explained hereinafter in connection with the schematic showing in Fig. 19 of the geometrical relationships of the elements of the optical path.

Although the present invention is not limited to the simultaneous location of approximately three full reflector surfaces in the field of illumination, this condition is preferred from a practical point of view, particularly since the present application may be employed to advantage in projecting moving pictures in natural colors with the employment of three primary colors, as hereinafter more fully explained. Thus, suitable masking means 164 are associated with the cam means 156 so to limit the impingement on the swingable reflectors of the light rays in the field of illumination. As will best be seen in Figs. 2, 8, 12, and 15 to 18 incl., the masking means 164 preferably comprises a masking shoe or curved shield 165 having an elongated, arcuate mask opening 166 therein to limit the impingement-effective field of illumination to the extent illustrated in Fig. 17 including substantially three full swingable reflective surfaces 138—138. The shoe or shield 165 is provided with a side mounting flange 167, preferably carrying a pair of dowel pins 168 which are received in holes in a cam mechanism hood 169, and a hole 170 through which extends a thumb screw 171 threadably received in an internally threaded hole in the cam hood. Thus, with the cam hood 169 suitably fixedly mounted, the masking shield 165 is suitably supported thereby. The cam hood 169 preferably is in the form shown in Figs. 2, 8, and 15 to 18 incl., open on the radial inward and outward sides thereof, and having a face plate 172 to provide a platform for support of the cam means 156, including the cam plate 157 and adjustable mechanism therefor, hereinafter more fully described. The cam hood 169 includes a pair of end members 173, 173, supporting the face plate 172, extending inward therefrom and suitably mounted upon the basket or nest ring 101, such as by screws indicated in dotted lines at 174—174 in Figs. 2 and 8.

Figure 24:
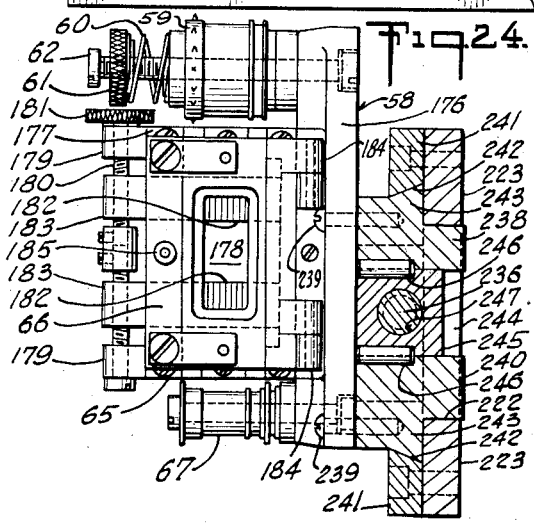
Fig. 24 is a sectional view taken substantially on line 24—24 of Fig. 22.

As will be seen from Figs. 3, 5 and 24, the film track means or gate unit 58 includes the apertured track means 65 as a relatively fixed bracket plate 175, constituting a portion of bracket 176, faced with a track plate 177 having an aperture 178 therein. The edge of the bracket plate 175 nearest the door 45 for ready accessibility carries a pair of fixed apertured ears 179, 179, through which a two-part threaded shaft 180 is rotatably mounted with the latter carrying above the topmost ear a manual knurled knob 181. A pair of masking plates 182, 182, best seen in Fig. 24, are slidably mounted between the bracket plate 175 and the track plate 177, each carrying an ear 183 having an internally-threaded hole extending therethrough in which the threaded shaft 180 is threadably engaged for advance and retraction thereon. Thus, when the knurled knob 181 is rotated to rotate the threaded shaft 180, the masking plates 182, 182 may be caused to approach or retract away from each other to adjust the effective size of the aperture 178. The aperture 178 preferably initially has a height (dimension along the path of film travel) of about three frames or film positive prints so that light rays from the source which pass through the casing opening 47 will pass through a length of film about three frames long, such device making it possible to shorten as desired such light-traversed length of film. The apertured gate or pressure plate 66 is pivotally mounted at 184, 184 to the bracket plate 175 to complete the gate unit 55, and after the film has been positioned between it and the apertured track means 65, the gate may be secured to the latter by thumb screw 185.

The objective 186 is mounted in front of the gate unit 58 and between the latter and the rotary reflector wheel mechanism 100 so that both the gate unit and the objective are mounted to one axial side of the rotary reflector wheel mechanism to define one portion of the objective path which extends toward and at least partially through the rotary reflector wheel mechanism. Preferably, the objective 186 is slidably mounted in a fixed tubular hood 187, but may be fixedly mounted therein except for a desire of adjusting the position of the objective along the optical path relative to the fixed-position rotary reflector wheel mechanism as explained hereinafter. The tubular hood 187 is mounted upon a bracket plate 188 supported by cross wall 46 and preferably is located substantially within the rotable ring means 117, as will be seen from Fig. 3. The objective 186 preferably is cradled in a bifurcated bracket 189 upon which it is clamped by suitable spring strap means 190, and the mount of the cradling bracket upon the bracket plate 188 will be described more fully hereinafter.

Relatively fixed reflective means in the nature of an angularly-disposed reflector 191 is fixedly mounted in the tubular hood 187 to intercept and deflect laterally a light beam passing along the portion of the optical path defined by the aligned aperture 178 and the objective 186. The angular disposition of the relatively fixed reflector 191 is such as to reflect the incident rays through a hood side opening 192 to the field of illumination defined by the mask opening 166 and the swingable reflectors 126—126 exposed to impingement therein. The deflected rays, upon impinging the swingable reflectors 126—126 in the mask opening 166, are reflected back by the latter toward the center of the rotary reflector wheel mechanism 100 for impingement upon additional relatively fixed reflective means, e.g., a second angularly-disposed fixed reflector 193, also supported on the bracket plate 188 by suitable supporting clip means 194, as best seen in Fig. 3. The deflected rays incident upon the second fixed reflector 193 are then reflected forward so as, after passing completely through the rotary reflector wheel mechanism 100 or its open ring 117, to project out through the front opening 50 in the front cover plate or panel 43. The second fixed reflector 193 thus dictates another portion of the optical path located on the other axial side of the rotary reflector wheel mechanism 100 and its open ring 117.

The operation of the previously-described embodiment of the optical apparatus of the present invention as a projector may be best understood by reference to the schematic showing in Fig. 19. Therein is diagrammatically indicated in alignment a light source 195 and a condenser 196 which preferably are mounted in the light source unit 32 of the Fig. 1 set-up behind the inlet hole 47 of the encased apparatus 30 and the gate aperture 178. An image of the aperture content is projected as a bundle of light rays 197 along the optical axis A—A defined in part by the apertured gate unit 58 and objective 186. The lateral deflections attained by the fixed reflectors 191 and 193 have been omitted for simplicity. Three of the swingable reflectors 126—126 are diagrammatically illustrated in full lines in the field of illumination at $R_1$, $R_2$ and $R_3$ respectively, which correspond to the positions 162, 161 and 160. If these reflectors 126—126 were arranged in the dotted positions of R', $R_2$ and R''', so that their reflective surfaces were disposed in a common flat plane, making a common angle C to the lens or optical path axis A—A, they would direct the bundle of light rays along optical axis $A_2$—$A_2$ from point P to a screen diagrammatically illustrated at 37. Axis $A_2$—$A_2$ is $\beta^0$ from the lens axis $A_2$—$A_2$ and $\beta = 180° - 2C$. In such case, the series of reflectors 126—126, when in the positions of orientation R', $R_2$ and R''', act as a single continuous reflector with any one of the reflectors 126, by itself, serving to project an image of the aperture content to the screen 37, the optical system being so designed that a light point at the aperture 178 is represented by an area of light in the light bundle 197 that impinges all of the reflectors 126—126 in the illumination field, and it may be considered that the single image of the aperture content on the screen is made up of three separate superimposed images reflected by the reflectors at positions R', $R_2$ and R'''.

When reflectors R' and R''' are rocked or swung in opposite directions by equal amounts through an angle $$\frac{\theta}{2}$$

about point P to their full line positions $R_1$ and $R_3$ respectively at 162 and 160, each of the three reflectors $R_1$, $R_2$ and $R_3$ will have a different axis of reflection of the aperture image, these differing axes being designated respectively $A_1$—$A_1$, $A_2$—$A_2$ and $A_3$—$A_3$. Three images of the aperture content are now formed at screen 37 equidistant (X') from point P about the respective axes $A_1$—$A_1$, $A_2$—$A_2$ and $A_3$—$A_3$, since each reflector 126 in the light bundle 197 forms an image of the aperture content and those axes diverge one from another by the angle $\theta$. Regardless of the aperture size, the projected aperture images are offset one from another by an amount equal to the frame or picture pitch multiplied by the magnification of the optical system and this offset relation remains constant throughout the travel of the aperture images across the screen. The angle of divergence $\theta$ may be expressed by the mathematical formula $$\tan\frac{\theta}{2} = \frac{\tfrac{1}{2}Mp}{X'}$$

also $$M = \frac{X' + L}{S}$$

where M is the magnification, p is the picture pitch, and S, L and X' are the distances indicated in Fig. 19. If L is very small in comparison to X', then $$\tan\frac{\theta}{2} = \frac{p}{2S}$$

The latter formula indicates that for "long throw" projection (X'), where the distance to the screen is relatively great, the angle $\theta$ is substantially equal to the angle one picture pitch (p) subtends with the node of the objective 186.

Synchronous drive of the open ring 117 to translate the swingable reflectors 126—126 upwardly through the field of illumination and of the film advancing sprocket 78 to pull the film frames or positive pictures down past the aperture will assure that the aperture images pass across the screen at the same frequency the picture images pass through the aperture 178, as is attached by the embodiment of the apparatus illustrated in the present drawings. As the picture images pass through the aperture the axes $A_1$—$A_1$, $A_2$—$A_2$ and $A_3$—$A_3$ must rotate and the angular velocity (W) thereof may be expressed by the mathematical formula $$W = \frac{VM}{X'}$$

and $$M = \frac{X' + L}{S}$$

where V is the angular velocity of the film with respect to the node of the objective 186, M is the magnification, and X', L and S are the distances indicated in Fig. 19. If, again, L is considered to be very small in comparison to X', then $$W = \frac{V}{S}$$

This latter formula indicates that for "long throw" projection, W is substantially equal to the angular velocity of the film with respect to the node of the objective, and in order to impart this angular motion to the plurality of reflective axes $A_1$—$A_1$, $A_2$—$A_2$ and $A_3$—$A_3$, the swingable reflectors 126—126 must swing as they successively pass through the field of illumination at a velocity of $W_1$, where $$W_1 = \frac{W}{2}$$

Each of the swingable reflectors 126 reflects an aperture image to the screen 37 and since these images pass across the screen at a frequency equal to that of the passage of the picture images through the aperture 178, the reflectors must translate through point P at the same frequency. Consequently, while each of the reflectors 126 is being translated through the field of illumination, an extension of its reflective plane surface will always include point P and it is translated at a velocity that enables it and adjacent reflectors, i.e., those of the group which are simultaneously being translated through the field of illumination, to maintain the same frequency through point P as the picture image is maintained through the aperture with maintenance of the angle $\theta$ between its reflective axis and the reflective axes of the adjacent reflectors, or the angle $$\frac{\theta}{2}$$

between its reflective surface and the reflective surfaces of the adjacent reflectors.

The embodiment of the optical apparatus of the invention illustrated in the drawings is designed to handle 16 mm. film and thus the aperture opening 178 may be about ⅜" wide and about ⅞" long, preferably with thirty-six of the reflectors 126—126 being pivotally carried by the rotatable ring means 117. The optical system thereof and some of the geometrical relationships of parts which embody the principles schematically shown in Fig. 19 are diagrammatically illustrated in Figs. 20 and 21. The light source comprising the lamp 195 and the condenser 196 project a beam of light through the film 35 as it passes across the aperture 178 and the gate unit 58 to cause a bundle of image rays to pass along the first portion of the optical path, the principle axis of which is indicated at Z—Z, through the objective 186 to the fixed reflector 191 within the rotatable ring means 117. The bundle of image rays projected by the objective 186 is then deflected by the fixed reflector 191 in the rotatable ring means 117 laterally to a group of the translating reflectors 126—126 with the principal axis of the beam impinging at point P the swingable reflector which is in the mid-position 161 while rays in the beam bundle simultaneously impinge upon the group of reflectors being translated through the field of illumination. The reflectors 126—126 in the group being translated through the field of illumination then reflect the rays incident thereon to the second fixed reflector 193 mounted within the rotatable ring means 117 to be reflected out to the screen 37. It will be noted that the geometrical axis G—G of the rotatable ring means 117, indicated in Fig. 20, is arranged at an angle Ω to the principal axis Z—Z of the first portion of the optical path since the compound angle of the first fixed reflector 191 causes a geometrical projection of the central axis of the film to be tilted as it strikes point P. Angle Ω may be defined by the formula $$\tan \Omega = \sin \frac{\beta}{2} \tan \frac{\phi}{2}$$

where the angle $\beta$ is that indicated in Figs. 19 and 21, and angle $\phi$ is that between the Z—Z axis and the principal axis of that portion of the optical path extending between fixed reflector 191 and the swingable reflector 161 at point P. When angle $$\frac{\phi}{2} \text{ is } 45°$$

as is the case in the embodiment of the optical apparatus illustrated in the drawings, the formula may be simplified to $$\tan \Omega = \sin \frac{\beta}{2}$$

As previously pointed out, the gear ratio between the drive of the rotatable ring means 117 and that of the driven film sprocket 78 is such that the swingable reflectors 126—126 pass through point P at the same frequency that the film frames pass across the aperture 178. With rotation of the rotatable ring means 117, the swingable reflectors 126—126 are successively translated through the field of illumination and as any given one thereof enters the latter its actuating cam follower 150 is wiped along the relatively fixed cam 157 to cause this reflector to swing during translation in the manner taught above in connection with the showing in Fig. 19. As a result, a plurality of aperture images are reflected from the group of reflectors 126—126 as they are translated through the field of illumination defined by the mask opening 166 forward to the screen 37 to produce a continuous stationary picture projected from a continuously-moving film carrying a series of successively-arranged positive prints or frames. If the gate aperture 178 is adjusted simultaneously to accommodate therein picture images of a plurality of the positive film frames, such as three, as previously proposed, a plurality of the reflected aperture images are superimposed at the screen 37.

Thus the embodiment of the apparatus illustrated in the drawings may be used to advantage in the projection of moving pictures in natural colors from a photographic film carrying a series of positive prints suitably prepared in conformance with the employment of color technique in camera operation well known in the art. For example, the reflectors 126–126 may be of a special type to pass the unwanted light rays of certain color frequencies out of the optical system but to reflect along the optical path the rays of desired color frequency. For this purpose, dichroic mirrors may be employed and their use may be embodied in an arrangement where one reflector of a group of three successively-arranged reflectors 126—126 will reflect only reddish rays, the next succeeding reflector in the group will reflect only bluish rays, and the third succeeding reflector in the group will reflect only greenish rays, and with this pattern of relative arrangement repeated so that with the use of thirty-six reflectors, there will be twelve like groups. Projections of moving pictures in natural color by this means has an appreciable advantage over prior art practices where filters in the form of color belts and color wheels are employed, since in the latter practice, the light rays must pass through two additional surfaces in the optical path, causing undesirable loss.

The embodiment of the present invention illustrated in the drawings is also designed for adaptation to various conditions of projection of moving pictures and film characteristics. Film shrinkage changes the picture pitch and the distance from the apparatus to the screen governs the magnification of the optical system. As previously pointed out, as the aperture images pass across the screen a clear-cut picture image, in focus, is constantly maintained in a stationary position on the screen by projecting thereto a series of aperture images offset from each other in an amount equal to a predetermined picture pitch. The amount of the aperture image offset is controlled by the angle $$\frac{\theta}{2}$$

as explained in connection with Fig. 19, which is the angle the swingable reflectors 126—126 maintain with respect to each other as they are translated through the field of illumination. In the embodiment of the apparatus illustrated in the drawings, compensation for these factors is provided by means for adjusting the orientation of the relatively fixed cam 157.

As will be seen from Figs. 2, 8 to 11 inclusive, 15, 16 and 18, the cam plate 157 is pinned and secured to a mounting plate 198 by dowels 199, 199 and screws 200, 200, as is best seen in Figs. 9, 10 and 11. Also, as will be seen from those figures, the mounting plate 198 is arcuately recessed on its underside at 201 to provide rotary clearance for the cover ring 128 with the inside edge 158 of the cam 157 extending into the slot 129 between the ring flange 148 and the cover ring 128. As will be understood from Figs. 15 and 18, opposite ends of the mounting plate 198 are arcuately rabbetted as indicated at 202, 202 to be swingably mounted to the cam hood face plate 172 about a pivot stud 204 by rabbetted end plates 203, 203. The pivot stud 204 is press-fitted in a hole in the cam hood plate 172 and rotatably received in a hole in the support plate. Thus, when the support plate 198 is swung about its pivot stud 204, it swings therewith the cam plate 157 to adjust the orientation of the contoured inner edge 158 thereof relative to the path described by the cam follower rollers 150—150.

Swing is imposed upon the cam support plate 198 by means of a stud 205 mounted thereon and disposed in a transverse slot 206 in plate 172, indicated in Figs. 11 and 18. The stud 205 pivotally carries a slide block 207 which is slidably received within a slot 208 in the nose 209 of an operating lever 210. The operating lever 210 is pivoted about a stud 211 preferably provided as a boss on cam hood plate 172 and has a transverse slot 212 therein through which the pivoted stud 204 is received. Cap screw 213 is mounted in boss stud 211 and cap screw 214 is mounted in pivot stud 204 with their heads respectively located above the operating lever 210.

Swing is imparted to the operating lever 210 by means of a worm and segmental gear device which, as will be seen from Figs. 2, 8 and 18, may comprise a segmental gear 215 on the other end of operating lever 210 meshed with a worm 216 carried by a shaft 217 rotatably supported by journals 218, 218 supported by a bridge bracket 219 mounted upon cam hood plate 172. Shaft 217 is extended out through a hole in the casing side wall 42 to carry therebeyond a manual operating knob 220 for rotation of the worm so as to swing the operating lever 210 back and forth. Thus, the operating lever 210 and the cam-supporting plate 198 together serve as a compound lever operated by worm and gear means manually manipulated. As a result, the cam plate 157 may be swung back and forth about a pivot axis provided by the pivot stud 204 so as to change the orientation of the cam surface 158.

In order to understand the correction attained by such adjustment of the cam plate 157, reference should be had to Figs. 15, 16 and 21 wherein it will be seen that the reflector 126 at mid-position 161 has a center of curvature of its cam follower roller located at point T. Thus, in order to avoid any rock or swing affectation of that reflector by the swing adjustment of the cam plate 157, the latter must be swung about the point or axis T parallel to the rotary reflector wheel mechanism axis G—G. Consequently, as the cam plate 157 is swung about the axis T, it will impart no motion to the reflector 126 at the mid-position 161 but will rock the reflectors at the approach and receding positions 160 and 162 on opposite sides thereof in opposite directions through equal angles. Thus, this swing of the cam 157 will not disturb the central axis of projection but will alter the angle the reflectors maintain one to another as they pass through the field of illumination. Determination of the proper amount of swing adjustment of the cam plate 157 by manipulation of the manual knob 220 is a simple matter, being attained by observation of the character of the image projected on the screen, since proper superimposition of the swingable reflector images thereat will provide sharpness and clarity and freedom from "double images." The employment of a worm and gear drive of the compound lever for adjusting the swing of the cam plate 157 assures self-locking in any adjusted position.

The embodiment of the apparatus illustrated in the drawings is also equipped with simple means for properly adjusting the focus of the optical apparatus in precise fashion when employed as a moving picture projector. This assures that by simple manual adjustment of the focus, an operator may readily form an image on the screen regardless of the distance between the latter and the apparatus. In the present device such focus-adjusting means maintains a necessary relationship between the position of the film as dictated by the gate unit, the objective and the fixed-position rotary reflector wheel-mechanism, so as to satisfy a requirement that the frame or picture pitch of the film subtends substantially the same angle to the node of the objective as any adjacent pair of swingable-reflectors subtends to this lens node. For attainment thereof, if the distance from the film to the objective is varied, the distance from the objective to the swingable reflectors must also be varied and in a certain mathematical relationship, as will appear hereinafter from an analysis of the mechanism provided for that purpose following a description of that mechanism.

Figure 22:
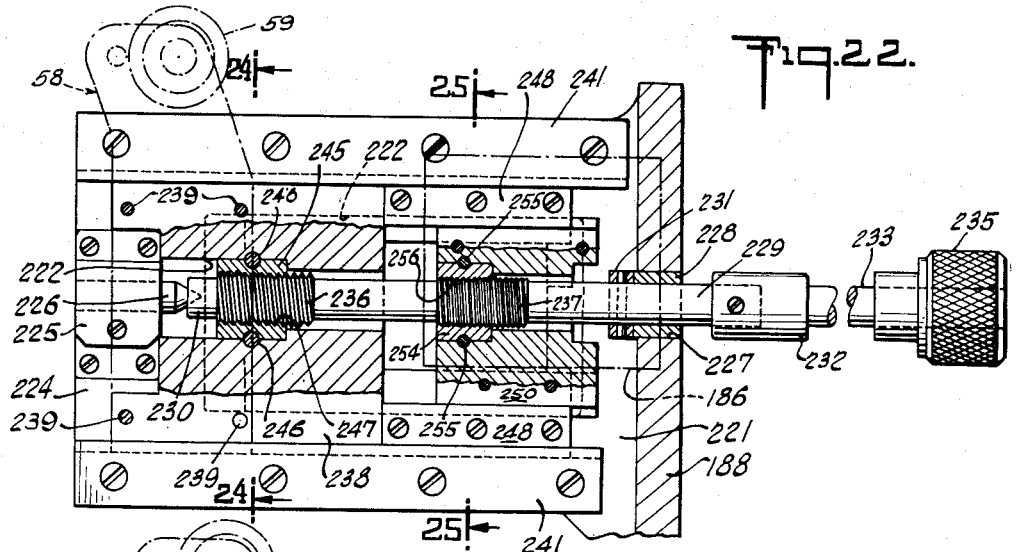
Fig. 22 is an enlarged sectional detail of the mounting and position-adjusting structure associated with the aperture or gate unit and the objective, with parts broken away, showing the gate unit and the objective as located in positions relatively remote from the rotary reflector wheel mechanism for relatively short throw.
Figure 23:
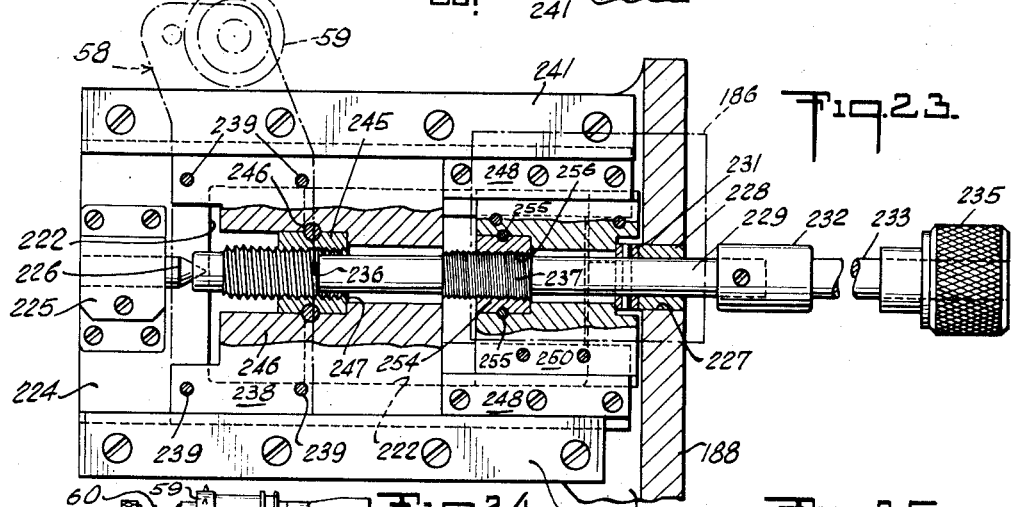
Fig. 23 is a view similar to Fig. 22 illustrating the relative positions of the gate unit and objective when caused to travel by such device toward the rotary reflector wheel mechanism for longer throw.

As will be seen from Figs. 3, 5 and 22 to 25 incl., the bracket plate 188 which is mounted on the cross wall 46 has extending rearwardly, substantially at right angles thereto, a vertically-extending support plate 221 having an elongated rectangular hole 222 therein to provide a pair of horizontally-extending, vertically-spaced guide rails 223, 223 and a vertical bar 224. The vertical bar 224 supports on the face thereof a pin clip 225 which clamps a conically-pointed thrust bearing pin 226 thereto in fixed position. The bracket plate 188 has a hole 227 extending therethrough in which is seated a journal sleeve 228 having its back end extending beyond the back face of this bracket plate, as is best seen in Figs. 22 and 23. A compound screw shaft 229 is rotatably mounted through the journal sleeve 228 and has its back end 230 provided with a conical recess receptive of the point of the thrust bearing pin 226. A collar 231 fixed on the screw shaft 229 is abutted against the back end of journal sleeve 228 so as to cooperate with the thrust pin 226 to prevent any axial shift of screw shaft 229 during rotation. A coupling 232 fastens to the forward end of screw shaft 229, extension shaft 233 which, as will be seen from Fig. 3, extends out through a hole 234 in the front panel 43 to carry on its projecting end a manual knob 235 for manual adjustment of the focus by rotating therewith the screw shaft 229.

The screw shaft 229 carries a pair of helically-threaded portions 236 and 237, preferably in the nature of sections thereof, carrying male helical threads of greater diameter than the shaft proper so that portions of the latter may slide through internally-threaded female members employed for sliding the gate unit 58 and the objective 186 along the principal axis of the first portion of the optical path. It will be seen from Figs. 3 and 5 that the axis of the compound screw means provided by the screw shaft 229 and its threaded sections 236 and 237 is substantially parallel to that optical path axis.

As will be understood from Figs. 22, 23 and 24, the bracket 176, upon which the gate unit 58 is mounted, is in turn supported by a slide member 238 which is fastened thereto by four screws 239—239. The slide member 238 carries a land 240 which projects into the slot or opening 222 and slides longitudinally between the guide rails 223, 223. Also, a pair of guide straps 241, 241 are fastened by screws to the faces of the guide rails 223, 223 having their opposed edges undercut, as will be seen at 242, 242 in Figs. 24 and 25, to provide parallel opposed V-shaped grooves. The slide member 238 is also provided with a pair of vertically-spaced V-shaped flanges 243, 243 which are shaped complementary to these V-shaped grooves and fit therein for sliding action, as will be seen from Figs. 24 and 25. Thus, the gate unit 58 is slidably mounted upon the guide structure 241 supported by the flange 221 of the bracket plate 188.

A slot 244 in the slide member 238 receives therein a nut block 245 held in fixed position therein by pins 246, 246. The nut block 245 has an internally-threaded hole 247 extending therethrough, provided with helical female threads mated with the male threads of the screw shaft section 236. Thus, when the screw shaft 229 is rotated by the manual knob 235 the threaded section 236 thereof causes the nut block 245 to translate axially with the latter in turn causing the slide member 238 to slide along the guide 221 for translation along the optical path.

Figure 25:
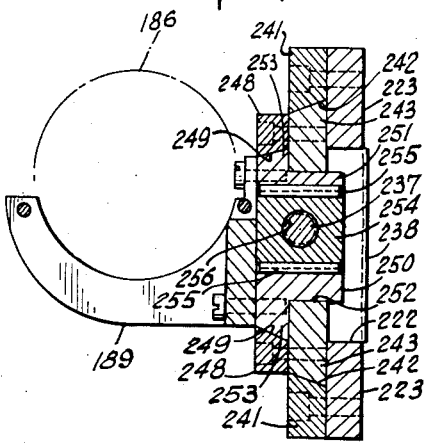
Fig. 25 is a sectional view taken substantially on line 25—25 of Fig. 22.

As will be seen from Figs. 22, 23 and 25, the slide member 238 also carries affixed to the face thereof an additional pair of straps 248, 248 affixed thereto by screws also having undercut opposed edges 249, 249 to provide V-shaped parallel grooves. The cradle 189 which supports the objective unit 186 is mounted by screws upon a second slide 250 having a projection 251 slidably received in an elongated slot 252 in a portion of the slide member 238. The slide 250 also has a pair of V-shaped flanges 253, 253 which are made complementary to the V-shaped grooves provided by the undercuts at 249, 249 for sliding motion relative to the slide member 238. Thus, the objective unit 186 is slidably mounted upon the slide 238 which supports the gate unit 58. The second slide 251 is slotted to carry a second nut block 254 which is fixed in the slot by pins 255, 255 so as to cause translation of objective slide 250 therewith. The nut block 254 is provided with an internally-threaded through hole 256 having helical female threads mated with the threads of the compound screw threaded section 237. Thus, with rotation of the compound screw shaft 229, the objective unit 186 is also translated along the optical path simultaneously with translation of the gate unit 58 therealong.

It will be noted that the pitch of the threads of the threaded section 236 which translates the gate unit 58 is appreciably greater than the pitch of the threads of the threaded section 237 which translates the objective unit 186, whereby the rate of travel of the latter is appreciably less than that of the gate unit when they are translated simultaneously with manual manipulation of the knob 235. This assures maintenance of the essential optical relationships between the optical elements comprising the gate unit which defines the film path, the objective, and the relatively fixed rotary reflector wheel mechanism during focal adjustments which simultaneously move the gate unit and the objective, and the ratio of the movement of the gate unit and the objective relative to the rotary reflector wheel mechanism is found to be a constant. If $p$ represents the film frame or picture pitch and $p'$ represents the swingable reflector pitch (the distance between the centers of a juxtaposed pair of the swingable reflectors), then this ratio may be expressed as $$\frac{p+p'}{p'}$$

If $N$ represents the number of threads per inch of the threaded section 236 which translates the gate unit 58 and $n$ represents the number of threads per inch of the threaded section 237 which translates the objective unit 186, the difference in the pitches of these two threaded sections may be expresed as $$\frac{n}{N}$$

and $$\frac{n}{N} \text{ equals } \frac{p+p'}{p'}$$

In the particular embodiment illustrated by way of example in the drawings, the threaded section 236 for translation of the gate unit 58 has sixteen threads per inch ($N$) and the section 237 for translation of the objective unit 186 has twenty-four threads per inch ($n$) and thus, the ratio of the pitches of those threaded sections is 2:3. Consequently, the motion of the gate unit 58 along the optical path relative to the rotary reflector wheel mechanism 100 is 1.5 times the translation of the objective along that optical path.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and desired to be secured by Letters Patent is:

1. Optical apparatus comprising, in combination; a rotary reflector wheel mechanism comprising a driven open rotatable ring means having an open central through space permitting passage therethrough of a light beam and carrying for rotary translation a plurality of successively-arranged juxtaposed swingable flat-plane reflectors facing inward toward the axis of said ring means, means defining a film track mounted to one axial side of said ring means, a continuously open lens system comprising an objective located between said ring means and said film track means to define therebetween a portion of an optical path, means on the axially opposite side of said ring means to define another portion of the optical path, relatively fixed reflective means to deflect an incident beam of light passing along one of said optical path portions laterally to a field of illumination traversed simultaneously by a group of the successively-arranged swingable reflectors as they are angularly translated by said ring means with the principal axis of the incident beam at this traversed field defining a reflector mid-position, to deflect the beam of light reflected from other relatively fixed reflective means said group of swingable reflectors back to the other optical path portion, means pivotally supporting each of said reflectors individually on the inside of said ring means to permit swing of each reflector about an axis of its own parallel to the axis of said ring means, a plurality of levering means of equal effective length with each carried by one of said swingable reflectors and having an individual cam follower to be carried along a generally circular path in the rotation of said ring means; elongated cam means supported adjacent said ring means and having a generally arcuate cam face mounted along the cam follower circular path to be wiped by each cam follower as the swingable reflector carrying the latter is translated through the illumination field with the cam face contour causing successively during such translation swing of each reflector about its own axis in one direction to an initial position of approach where the optical axis of the reflector makes a diverging angle with the principal axis of the beam on the second-mentioned axial side of said ring means approximately equal to the angle one film frame pitch subtends with the node of the objective, then in forward angular translation to the mid-position gradual swing back until the reflector optical axis is caused substantially to coincide with the incident beam axis at the mid-position and finally in further forward angular translation to a third position gradual further swing until the reflector optical axis makes a diverging angle of similar extent with the same portion of the beam axis on the opposite side of the latter; support means pivotally carrying said cam means for temporary orientation in a plane substantially parallel to the plane of said ring means while permitting adjustment of its angular setting in its plane of orientation about an axis at the location of the cam follower carried by one of the swingable reflectors when the latter is in the mid-position; and means to adjust the angular setting of said cam about its axis, whereby coincidence of images projected to a screen by said apparatus from a positive film traveling along said film track may be attained with accommodation of any particular throw distance from the apparatus to the screen and any film shrinkage that varies picture pitch.

2. The optical apparatus as defined in claim 1 characterized by said apparatus having frame means including a relatively fixed nesting ring in which said driven ring is rotatably mounted, said cam means being pivotally mounted on one side of said nesting ring, said adjusting means comprising worm gear means mounted on said nesting ring and manual means to manipulate said worm gear means.

3. The optical apparatus as defined in claim 2 characterized by said adjusting means as comprising compound lever means pivotally mounted on said nesting ring and connected to said cam means, said compound lever means carrying a worm gear segment, and a rotatable worm meshed with said worm gear segment rotatably mounted on said nesting ring and carrying a manual knob for manual rotation thereof.

4. Optical apparatus comprising, in combination; a rotary reflector wheel mechanism comprising a driven open rotatable ring means having an open central through space permitting passage therethrough of a light beam, said open ring means carrying for rotary translation a plurality of successively-arranged juxtaposed swingable flat-plane reflectors facing inward toward the axis of said ring means, frame means rotatably carrying said rotatable open ring means for rotation in a circular path, a movable gate unit defining a film track mounted to one axial side of said ring means, a continuously open lens system comprising a movable objective unit located between said ring means and said gate unit to define therebetween a portion of an optical path, means on the axially opposite side of said ring means to define another portion of the optical path, relatively fixed reflective means to deflect a beam of light passing along one of said optical path portions laterally to a group of the successively-arranged swingable reflectors and back to the other optical path portion whereby the reflectors of said group are located simultaneously in a reflector-traversed field of illumination of the light beam and carried therethrough successively with the principal axis of the beam at this traversed field defining a reflector mid-position, means successively to swing said reflectors as they are translated by said ring means through the illumination field including structure supported by said frame means arranged arcuately along a portion of the circular path of rotation of said ring means and other structure carried by said reflectors exterior of the open ring means central space to prevent obstruction of the latter, said reflector swinging means causing each of said reflectors in translation thereof through the illumination field to swing first on approach toward the mid-position to an initial position where the optical axis of the approaching reflector makes a diverging angle with the beam axis on the second-mentioned axial side of said ring means approximately equal to the angle one film frame pitch subtends with the node of the objective, then to the mid-position where the reflector axis is caused substantially to coincide with the beam axis and finally on recession to a third position where the reflector optical axis makes a diverging angle of similar extent with the same portion of the beam axis on the opposite side of the latter, means movably supporting said gate unit for travel along the first mentioned optical path portion relative to said ring means, means movably supporting said objective unit for similar relative travel, elongated compound screw means mounted on said frame means substantially parallel to said path portion, means rotatably supporting said compound screw means with maintenance of one axial position relative to said ring means, and a pair of helically-threaded portions on said compound screw means respectively threadably engaged with said gate unit and said objective unit simultaneously to effect travel thereof along the optical path portion toward and away from said ring means, the threaded portion engaged with said gate unit having helical threads of a pitch appreciably greater than the pitch of those of the threaded portion engaged with said objective unit whereby rate of travel of latter is appreciably less than that of said gate unit.

5. The optical apparatus as defined in claim 4 characterized by said screw means being in the form of an elongated straight shaft, said means for mounting said gate unit and objective unit comprising a relatively fixed guide frame having bearing means rotatably supporting said screw shaft without axial translation thereof, and a pair of slide means slidably mounted upon said frame for in-line motion substantially parallel to the axis of said shaft, said pair of slide means respectively having thread engagement with said threaded portions carried by said shaft, and means mounting said gate unit and said objective unit respectively on said pair of slide means.

6. The optical apparatus as defined in claim 5 characterized by said threaded portions being provided as integral, axially-spaced externally-threaded sections of said shaft with the latter having one end extending from said apparatus and carrying a manual knob for manual rotation thereof.

7. The optical apparatus as defined in claim 5 characterized by said guide frame and said gate unit slide means having interfitting guide and bar elements, said slide means which supports said objective unit being in turn slidably mounted upon said gate unit slide means by guide and bar elements.

8. Optical apparatus comprising, in combination; an encased frame structure having a substantially horizontal base; a gate unit mounted in said frame structure providing a downwardly-extending film guide track and having a light aperture therein; an objective mounted in said frame structure in front of said aperture to define therewith an optical path extending forward generally parallel to said base; a rotary reflector wheel mechanism mounted in said frame structure in front of said objective and comprising a rotatable open ring having an open central through space and pivotally supporting a plurality of successively-arranged, juxtaposed, flat-plane, biased, like swingable reflectors facing inward toward the axis of said ring with the pivot axis of each reflector being in the plane of its reflective surface and substantially parallel to the ring axis, and means rotatably supporting said ring in said frame structure in an upwardly-extending transverse plane; masking means fixedly mounted in said frame structure having an opening therein defining a field of illumination in which is exposed to impingement of a light beam a group of said swingable reflectors; a pair of fixed reflectors mounted generally within said open ring and supported by said frame structure with one located in the optical path defined by said gate unit aperture and objective to deflect light rays of an incident beam from said path to the group of swingable reflectors exposed in the mask opening and the other located in the path of the beam reflected from said group of swingable reflectors to deflect it out of the front of said encased frame structure; said rotary reflector wheel mechanism including a plurality of cam followers each fixedly mounted at a like relative location to one of said swingable reflectors and with rotation of said ring describing a circular path; a relatively fixed cam mounted in the cam followers' path in the vicinity of said masking means to be wiped by the followers of the group of swingable reflectors exposed in the mask opening and as they are translated successively and simultaneously through the illumination field thereat, said cam being contoured to cause said swingable reflectors passing through the illumination field to swing with maintenance of an angle between the reflective axes of each successive pair of swingable reflectors as they pass through this field substantially equal to the angle to the node of said objective which is subtended by one film frame pitch at the gate aperture; means swingably mounted said cam for adjustment swing in a plane substantially normal to the axis of said ring about an axis at the location of the cam follower carried by any one of the swingable reflectors when the latter is in the position where its optical axis is in coincidence with the principal axis of the incident beam whereby adjustment swing of said cam imparts no swinging motion to any swingable reflector when in this position; mechanism adjustably to swing said cam on its mounting means, including manual operating means; and drive means synchronously to advance film continuously across the gate aperture and rotate said ring.

9. The optical apparatus as defined in claim 8 characterized by said cam being generally arcuate, elongated and pivotally mounted along a portion of the circular path, the cam operating mechanism as comprising a compound lever structure carrying a segmental gear meshed with a worm, said manual operating means comprising a knob fixed to said worm.

10. Optical apparatus comprising, in combination; an encased frame structure having a substantially horizontal base; a gate unit mounted in said frame structure providing a downwardly-extending film guide track and having a light aperture therein; an objective unit mounted in said frame structure in front of said aperture to define therewith an optical path extending forward generally parallel to said base; a rotary reflector wheel mechanism mounted in said frame structure in front of said objective unit and comprising a rotatable open ring having an open central through space and pivotally supporting a plurality of successively-arranged, juxtaposed, flat-plane, biased, like swingable reflectors facing inward toward the axis of said ring with the pivot axis of each reflector being in the plane of its reflective surface and substantially parallel to the ring axis, and means rotatably supporting said ring in said frame structure in an upwardly-extending transverse plane; masking means fixedly mounted in said frame structure having an opening therein defining a field of illumination in which is exposed to impingement of a light beam a group of said swingable reflectors; a pair of fixed reflectors mounted generally within said open ring and supported by said frame structure with one located in the optical path defined by said gate unit aperture and objective unit to deflect light rays from said path to the group of swingable reflectors exposed in the mask opening and the other located in the path of the beam reflected from said group of swingable reflectors to deflect it out of the front of said encased frame structure; said rotary reflector wheel mechanism including a plurality of cam followers each fixedly mounted to one of said swingable reflectors and with rotation of said ring describing a circular path; a relatively fixed, generally arcuate, elongated cam mounted in the cam followers' path in the vicinity of said masking means to be wiped by the followers of the group of swingable reflectors exposed in the mask opening and as they are translated successively and simultaneously through the illumination field thereat in the travel of said followers along their circular path, said generally arcuate cam being contoured to cause said swingable reflectors passing through the illumination field to swing with maintenance of an angle between the reflective axes of each successive pair of swingable reflectors as they pass through this field substantially equal to the angle to the node of said objective which is subtended by one film frame pitch at the gate aperture; means swingably mounting said generally arcuate, elongated cam for adjustment swing relative to the cam followers' circular path in a plane substantially normal to the axis of said ring; mechanism adjustably to swing said cam on its mounting means, including manual operating means; means slidably mounting said gate unit and said objective unit for differential movement along and substantially parallel to the axis of the optical path; compound screw means simultaneously to slide said gate unit and said objective unit along said path, said screw means including a pair of helically-threaded portions respectively threadably engaged with said gate unit and said objective unit with the helical threads for the latter being of appreciably less pitch than the pitch of those for the gate unit; and drive means synchronously to advance film continuously across the gate aperture and rotate said ring.

11. Optical apparatus comprising, in combination; an encased frame structure having a substantially horizontal base; a gate unit mounted in said frame structure providing a downwardly-extending film guide track and having a light aperture therein; an objective unit mounted in said frame structure in front of said aperture to define therewith an optical path extending forward generally parallel to said base; a rotary reflector wheel mechanism mounted in said frame structure in front of said objective unit and comprising a rotatable open ring having an open central through space and pivotally supporting a plurality of successively-arranged, juxtaposed, flat-plane, biased, like swingable reflectors facing inward toward the axis of said ring with the pivot axis of each reflector being in the plane of its reflective surface and substantially parallel to the ring axis, and means rotatably supporting said ring in said frame structure in an upwardly-extending transverse plane; masking means fixedly mounted in said frame structure having an opening therein defining a field of illumination in which is exposed to impingement of a light beam a group of said swingable reflectors; a pair of fixed reflectors mounted generally within said open ring and supported by said frame structure with one located in the optical path defined by said gate unit aperture and objective unit to deflect light rays from said path to the group of swingable reflectors exposed in the mask opening and the other located in the path of the beam reflected from said group of swingable reflectors to deflect it out of the front of said encased frame structure; said rotary reflector wheel mechanism including a plurality of cam followers each fixedly mounted to one of said swingable reflectors and with rotation of said ring describing a circular path; a relatively fixed, generally arcuate, elongated cam mounted in the cam followers' path in the vicinity of said masking means to be wiped by the followers of the group of swingable reflectors exposed in the mask opening and as they are translated successively and simultaneously through the illumination field thereat in the travel of said followers along their circular path, said generally arcuate cam being contoured to cause said swingable reflectors passing through the illumination field to swing with maintenance of an angle between the reflective axes of each successive pair of swingable reflectors as they pass through this field substantially equal to the angle to the node of said objective which is subtended by one film frame pitch at the gate aperture; means slidably mounting said gate unit and said objective unit for differential simultaneous movement along the optical path toward and away from said ring; compound screw means rotatably supported on said frame structure, including means to prevent axial motion thereof and manual means to rotate said screw means, said screw means having a pair of helically-threaded portions to be simultaneously rotated by said manual means and respectively threadably engaged with said gate unit and said objective unit, the helical threads of the portion engaged with said gate unit being of a pitch appreciably greater than the pitch of the helical threads engaged with said objective unit; and drive means synchronously to advance film continuously across the gate aperture and rotate said ring.

12. The optical apparatus as defined in claim 11 characterized by said means slidably mounting said gate unit and objective unit as comprising a pair of complementary guide and slide elements for said gate unit with one of said elements fixedly mounted on said frame structure and the other carrying said gate unit, and a pair of complementary guide and slide elements for said objective unit with one of the latter elements mounted on the slidable element carrying said gate unit and the other of the latter pair of elements carrying said objective unit, said screw means being a straight shaft rotatably supported on the element fixedly mounted on said frame structure and carrying said threaded portions as sections thereof, the ratio of the pitch of the threads for the gate unit to the pitch of the threads for objective unit being about 2:3.

References Cited in the file of this patent

UNITED STATES PATENTS

| 1,151,978 | Thorner | Aug. 31, 1915 |
| 1,456,776 | Higginson | May 29, 1923 |
| 1,549,750 | Dole | Aug. 18, 1925 |
| 1,575,133 | Steigman | Mar. 2, 1926 |

(Other references on following page)

UNITED STATES PATENTS

| | | | |
|---|---|---|---|
| 1,613,730 | Steigman | Jan. 11, | 1927 |
| 1,707,498 | Steigman | Apr. 2, | 1929 |
| 1,913,488 | John | June 13, | 1933 |
| 1,937,353 | Miller | Nov. 28, | 1933 |
| 2,713,285 | Holman | July 19, | 1955 |

FOREIGN PATENTS

| | | | |
|---|---|---|---|
| 589,740 | France | Feb. 27, | 1925 |
| 230,152 | Great Britain | Mar. 2, | 1925 |
| 319,284 | Great Britain | Sept. 18, | 1929 |
| 681,058 | Great Britain | Oct. 15, | 1952 |
| 493,641 | Germany | Mar. 11, | 1930 |